(12) United States Patent
Hong et al.

(10) Patent No.: US 11,195,244 B2
(45) Date of Patent: Dec. 7, 2021

(54) OPERATION METHOD FOR LOCATION RECOMMENDATION AND APPARATUS THEREFOR

(71) Applicant: Coupang Corp., Seoul (KR)

(72) Inventors: Sun Young Hong, Seoul (KR); Byung Suk Yang, Seoul (KR); Dae Yong Jang, Seoul (KR); Sang Min Jun, Seoul (KR); Ji Won Hwang, Seoul (KR)

(73) Assignee: Coupang Corp., Seoul (KR)

( * ) Notice: Subject to any disclaimer, the term of this patent is extended or adjusted under 35 U.S.C. 154(b) by 0 days.

(21) Appl. No.: 16/990,936

(22) Filed: Aug. 11, 2020

(65) Prior Publication Data

US 2021/0264551 A1   Aug. 26, 2021

(30) Foreign Application Priority Data

Feb. 24, 2020   (KR) .......................... 10-2020-0022570

(51) Int. Cl.
*G06Q 50/28*     (2012.01)
*G06Q 10/06*     (2012.01)

(52) U.S. Cl.
CPC ....... *G06Q 50/28* (2013.01); *G06Q 10/06315* (2013.01)

(58) Field of Classification Search
CPC ............. G06Q 50/28; G06Q 10/06315; G06Q 10/0637; G06Q 10/0635
See application file for complete search history.

(56) References Cited

U.S. PATENT DOCUMENTS

| 8,571,915 B1 * | 10/2013 | Wong ..................... G06Q 10/06 705/7.26 |
| 8,639,591 B1 * | 1/2014 | Mishra ................... G06Q 10/00 705/28 |
| 9,382,068 B1 * | 7/2016 | Quan .................... G06Q 10/083 |

(Continued)

FOREIGN PATENT DOCUMENTS

| JP | 2004-315101 A | 11/2004 |
| JP | 2013-147337 A | 8/2013 |
| JP | 2015-124023 A | 7/2015 |
| JP | 2019-159397   | 9/2019 |
| KR | 10-1551291    | 9/2015 |

(Continued)

OTHER PUBLICATIONS

Gu, Jinxiang, Marc Goetschalckx, and Leon F. McGinnis. "Research on warehouse operation: A comprehensive review." European journal of operational research 177.1 (2007): 1-21. (Year: 2007).*

(Continued)

*Primary Examiner* — Matthew S Gart
*Assistant Examiner* — Hamzeh Obaid
(74) *Attorney, Agent, or Firm* — Banner & Witcoff, Ltd.

(57) ABSTRACT

Provided is an electronic apparatus for location recommendation and an operation method thereof. The operation method includes receiving a placement request regarding a target item in a zone, upon the placement request, recognizing, based on information on the target item, a plurality of locations available for placement of the target item, based on the information on the target item and information on the plurality of locations, recognizing at least one location suitable for placement of the target item among the plurality of locations, and providing information on the at least one location.

14 Claims, 9 Drawing Sheets

(56) References Cited

U.S. PATENT DOCUMENTS

| | | | | |
|---|---|---|---|---|
| 2006/0271234 A1* | 11/2006 | Gaug | ............... | G06Q 10/109 700/213 |
| 2011/0153614 A1* | 6/2011 | Solomon | ............ | G06Q 10/087 707/740 |
| 2014/0074342 A1* | 3/2014 | Wong | ............... | B66F 9/0755 701/26 |
| 2014/0324491 A1* | 10/2014 | Banks | ............... | G06Q 10/087 705/7.12 |
| 2017/0046654 A1* | 2/2017 | Evers | ............... | G06Q 10/087 |
| 2018/0204170 A1* | 7/2018 | Kao | ............... | G06Q 30/0283 |
| 2018/0218471 A1* | 8/2018 | Stengel | ............ | G06Q 10/087 |
| 2018/0365631 A1* | 12/2018 | Moulin | ............ | G05B 19/41895 |
| 2020/0074402 A1* | 3/2020 | Adato | ............... | G06K 9/00771 |
| 2020/0223066 A1* | 7/2020 | Diankov | ............ | B25J 9/1679 |

FOREIGN PATENT DOCUMENTS

| | | |
|---|---|---|
| KR | 2016-0027840 | 3/2016 |
| KR | 2016-0044320 | 4/2016 |
| KR | 2016-0046571 | 4/2016 |
| KR | 10-1953069 | 2/2019 |
| KR | 10-1983018 | 5/2019 |
| WO | WO 2017/085769 A1 | 6/2017 |

OTHER PUBLICATIONS

Shrigan, D. "Mapping and improving the flow of inbound process of Assa Abloy warehouse." (2017). (Year: 2017).*

Office Action received in Korean Application No. 10-2020-0022570, dated Sep. 1, 2020.

* cited by examiner

OPERATION METHOD FOR LOCATION RECOMMENDATION AND APPARATUS THEREFOR

BACKGROUND

Technical Field

The present disclosure relates to an operation method for location recommendation and an apparatus therefor.

Description of the Related Art

Systems for storing and managing items to be shipped to customers upon placement of an order are of increasing importance in today's economic growth. New products are constantly developed and many products are released in real time on the market. While this growth provides consumers with more choices of goods and services, many companies involved in sales and brokerage businesses have difficulties in storing and managing items efficiently in response to rapid market changes.

In particular, in a physical location (for example, a fulfillment center) for storing items, it is necessary to recommend a location for placing an item to a worker so that the worker can quickly and correctly carry out a picking task. In particular, there is a need for a location recommendation function that can help improve a Unit Per Hour (UPH) of the picking task as well as a UPH of a stowing task.

SUMMARY

Technical Goals

An aspect provides an operation method for location recommendation and an apparatus therefor. Technical goals to be achieved through the example embodiments are not limited to the technical goals as described above, and other technical tasks can be inferred from the following example embodiments.

Technical Solutions

According to an aspect, there is provided an operation method for location recommendation, the method including receiving a placement request regarding a target item in a zone, upon the placement request, recognizing, based on information on the target item, a plurality of locations available for placement of the target item, based on the information on the target item and information on the plurality of locations, recognizing at least one location suitable for placement of the target item among the plurality of locations, and providing information on the at least one location.

In addition, the information on the target item may include one or more of the following: identification information, weight information, size information, shipment quantity information, expiration date-related information, and prime item-related information of the target item, and the information on the plurality of locations may include one or more of the following: information on relative distances between the plurality of locations, size information of each location, address information of each location, type information of each location, stack information of each location, fill rate information of each location, and prime zone-related information of each location.

Further, the recognizing of the at least one location may include recognizing a location that is positioned at a spot closest to a spot of a storage unit with the target item stored therein among the plurality of locations.

Further, the recognizing of the plurality of locations may include, based on information on all locations included in the zone, recognizing a plurality of locations satisfying a preset condition among all the locations, and the preset condition may be based on one or more of the following: type information of each location, stack information of each location, attribute information of a plurality of items placed at each location, and a frequency at which information on each location is provided as the information on the at least one location.

Further, the recognizing of the at least one location may include recognizing the at least one location among the plurality of locations by considering a volume of a stowable space of each of the plurality of locations and a volume of the target item stored in a storage unit.

Further, the recognizing of the at least one location may include obtaining, among the plurality of locations, a plurality of first locations, in each of which the volume of the stowable space is greater than a value calculated based on a total volume of the target item stored in the storage unit, and recognizing a location having a smallest volume of the stowable space among the plurality of first locations.

Further, the recognizing of the at least one location may include obtaining, among the plurality of locations, a plurality of second locations, in each of which the volume of the stowable space is greater than a value calculated based on a single volume of the target item stored in the storage unit, and recognizing a location having a largest volume of the stowable space among the plurality of second locations.

Further, the information on the target item may include one or more of size information and shipment quantity information of the target item, and the recognizing of the at least one location may include recognizing the at least one location by considering one or more of the following: an area in which the target item is to be placed according to the size information of the target item and a height at which the target item is to be placed according to the shipment quantity information of the target item.

Further, the information on the target item may further include at least one of expiration date-related information and prime item-related information of the target item, and the recognizing of the at least one location may include recognizing the at least one location by further considering whether one or more of the expiration date-related information and the prime item-related information of the target item matches information on items already placed at the plurality of locations.

According to another aspect, there is provided an electronic apparatus including a memory configured to store an instruction, and a processor configured to execute the instruction. The processor is further configured to, upon receiving a placement request regarding a target item, recognizing, based on information on the target item, a plurality of locations available for placement of the target item, based on the information on the target item and information on the plurality of locations, recognizing at least one location suitable for placement of the target item among the plurality of locations, and providing information on the at least one location.

According to yet another aspect, there is provided a terminal including an input device, an output device, and a controller. The controller is configured to receive an input of a placement request regarding a target item through the input device, upon the input of the placement request, recognize, based on information on the target item, a plurality of locations available for placement of the target item, based on the information on the target item and information on the plurality of locations, recognize at least one location suitable for placement of the target item among the plurality of locations, and output information on the at least one location through the output device.

Further, the controller may be further configured to receive, through the input device, an input of identification information for a location corresponding to a spot where a storage unit with the target item stored therein is positioned. At this point, the input of the identification information may be an input of identification information for a location that does not satisfy a preset condition.

Further, the controller may be further configured to receive an input of a range for the plurality of locations through the input device.

Details of other embodiments are included in the detailed description and drawings.

Effects

According to the present disclosure, while stocked items are moved in real time in a fulfillment center, it is possible to guide movement of a worker by considering a plurality of locations and attribute values of the stocked item respectively displayed at the plurality of locations.

In addition, since efficient placement of items reduces a worker's movement required for a picking task, it is possible to perform the picking task with less efforts and increase a UPH of the picking task.

The effects of the present disclosure are not limited to the effects mentioned above, and other effects not mentioned will become apparent to those skilled in the art from the description of the claims.

DETAILED DESCRIPTION

Terms used in embodiments are selected among common terms that are currently widely used in consideration of their functions in the present disclosure, but the terms may be different according to an intention of one of ordinary skill in the art, a precedent, or the advent of new technology. Also, in particular cases, the terms are discretionally selected by the applicant of the present disclosure, and the meaning of those terms will be described in detail in the corresponding part of the detailed description. Therefore, the terms used in the present disclosure are not merely designations of the terms, but the terms are defined based on the meaning of the terms and content throughout the present disclosure.

Throughout the specification, when a part is said to "include" a certain component, which means that it may further include other components, except to exclude other components unless otherwise stated. In addition, terms such as " . . . unit", " . . . module", or the like refer to units that perform at least one function or operation, and the units may be implemented as hardware or software or as a combination of hardware and software.

Throughout the specification, the expression "at least one of A, B, and C" may include the following meanings: A alone; B alone; C alone; both A and B together; both A and C together; both B and C together; and all three of A, B, and C together.

The term "terminal" mentioned below may be implemented as a computer or mobile terminal capable of accessing a server or another terminal over a network. The computer includes, for example, a laptop equipped with a web browser, a desktop, a laptop, and the like. The mobile terminal is, for example, wireless communication device assuring portability and mobility and may include any type of handheld-based wireless communication devices like communication-based terminals, which is based on International Mobile Telecommunication (IMT), Code Division Multiple Access (CDMA), W-Code Division Multiple Access (W-CDMA), Long Term Evolution (LTE), smart phones, tablet PCs, and the like.

Hereinafter, embodiments of the present disclosure will be described in detail with reference to the accompanying drawings so that those skilled in the art can easily carry out the present disclosure. However, the present disclosure may be implemented in various different forms but it is not limited to the exemplary embodiments described hereinafter. In the present disclosure, an item may refer to a single item or a set of items of the same category. In addition, an item may refer to a certain number of items of the same Stock Keeping Unit (SKU). For example, an item with a specific SKU ID may represent a certain number of items. Hereinafter, embodiments of the present disclosure will be described in detail with reference to the drawings.

Figure 1:
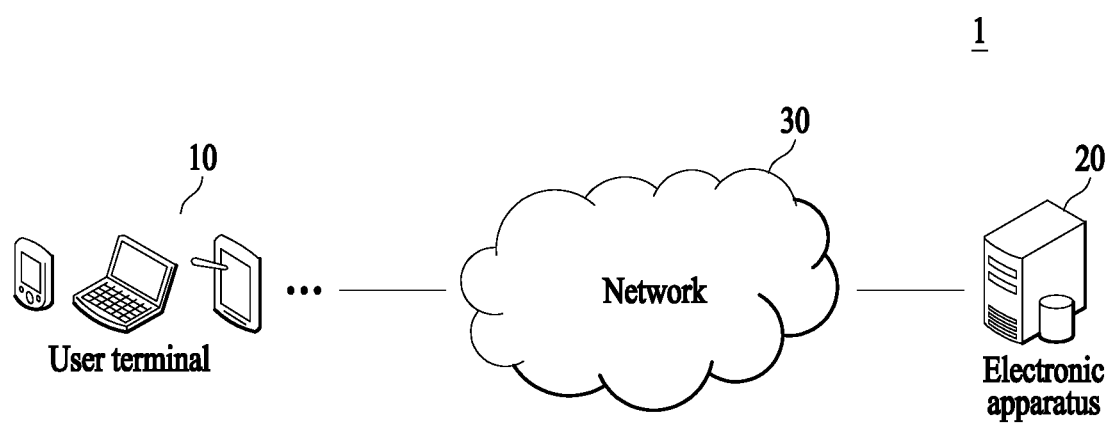
FIG. 1 illustrates an operation system for location recommendation according to an embodiment of the present disclosure.

FIG. 1 illustrates an operation system for location recommendation according to an embodiment of the present disclosure.

An operation system for location recommendation according to the present disclosure may be based on random stow. The random stow may refer to a method for placing various items at various locations in storage spaces arranged in rows, not a system for placing items in zones preset for the respective items. The random stow may minimize movement of a worker in inbound and outbound areas, thereby significantly reducing a work time. In addition, unlike a general fulfillment center where spaces for storing items are designated, random stow enables placement of items without leaving any space empty, and therefore, random stow is efficient in terms of space management. An operation system for location recommendation according to the present disclosure may refer to a system for recommending a space for displaying an item so that the space for displaying the item can be optimized under a random stow process.

Referring to FIG. 1, an operation system 1 for location recommendation may include a user terminal 10 and an electronic apparatus 20. The operation system 1 illustrated in FIG. 1 shows components related to the present embodiment. Accordingly, it would be understood by one of ordinary skill in the art that the operation system 1 may further include general-purpose components other than the components shown in FIG. 1.

The user terminal 10 and the electronic apparatus 20 may communicate with each other over a network 30. The network 30 may include a Local Area Network (LAN), a Wide Area Network (WAN), a Value Added Network (VAN), a mobile radio communication network, a satellite communication network, and a combination thereof, and the network is, in a broad sense, a data network via which components of each network illustrated in FIG. 1 actively communicate with each other and may include wired Internet, wireless Internet, and a mobile wireless communication network. Wireless communication may include, for example, but not limited to, wireless LAN (Wi-Fi), Bluetooth, Bluetooth low energy (Bluetooth low energy), Zigbee, WFD (Wi-Fi Direct), UWB (ultra wideband), infrared communication (IrDA, infrared data association)), NFC (Near Field Communication), and the like.

The user terminal 10 may provide a platform for location recommendation. Specifically, the user terminal 10 may receive an input of a placement request regarding a target item to display from a user. In this case, the placement request may be input in a zone in which the target item is to be placed. For example, in a first embodiment, the user terminal 10 may receive an input of identification information for a location corresponding to a spot where a storage unit with the target item stored therein is positioned. In a second embodiment, the user terminal 10 may receive an input of an address for a location available for placement of the target item. In a third embodiment, the user terminal 10 may receive an input of identification information for a location that does not satisfy a preset condition. The above embodiments will be described later in more detail with reference to the drawings.

In addition, upon the received input of the placement request, the user terminal 10 may recognize a plurality of locations available for placement of the target item. In addition, the user terminal 10 may recognize at least one location suitable for placement of the target item among the plurality of recognized locations. In this case, the plurality of locations or the at least one location may be acquired by the electronic apparatus 20 and transmitted to the user terminal 10. Alternatively, the user terminal 10 may recognize the plurality of locations available for placement of the target item based on the information on the target item. In addition, the user terminal 10 may recognize at least one location based on information on the target item and information on the plurality of locations.

In addition, the user terminal 10 may output information on the at least one recognized location. Information to be output may be information on an address of a location, and the user may move to the location corresponding to the address and place an item.

The electronic apparatus 20 may receive the placement request regarding the target item. The electronic apparatus 20 may directly receive an input of the placement request regarding the target item or may receive an input of the placement request regarding the target item from a user through the user terminal 10.

In addition, upon the received placement request, the electronic apparatus 20 may recognize a plurality of locations available for placement of the target item. In particular, the plurality of locations may be recognized based on the information on the target item to display. In addition, the electronic apparatus 20 may recognize at least one location suitable for placement of the target item among the plurality of locations. In this case, at least one location may be acquired from the plurality of locations through an additional determining process, and a detailed description thereof will be described with reference to the drawings in the present disclosure.

Also, the electronic apparatus 20 may provide information on at least one location. For example, information on at least one location may be output through a module related to an output of the electronic apparatus 20. Alternatively, the electronic apparatus 20 may transmit information on at least one location to the user terminal 10 to output the corresponding information through the user terminal 10.

The electronic apparatus 20 of the present disclosure may be a device included in a server for location recommendation. The server for location recommendation according to the present disclosure may in real time update information on locations where items are placed, as placing a target item is performed. For example, the server may in real time update how much quantity of which item is placed at each location and may store the updated information in a database.

Figure 2:
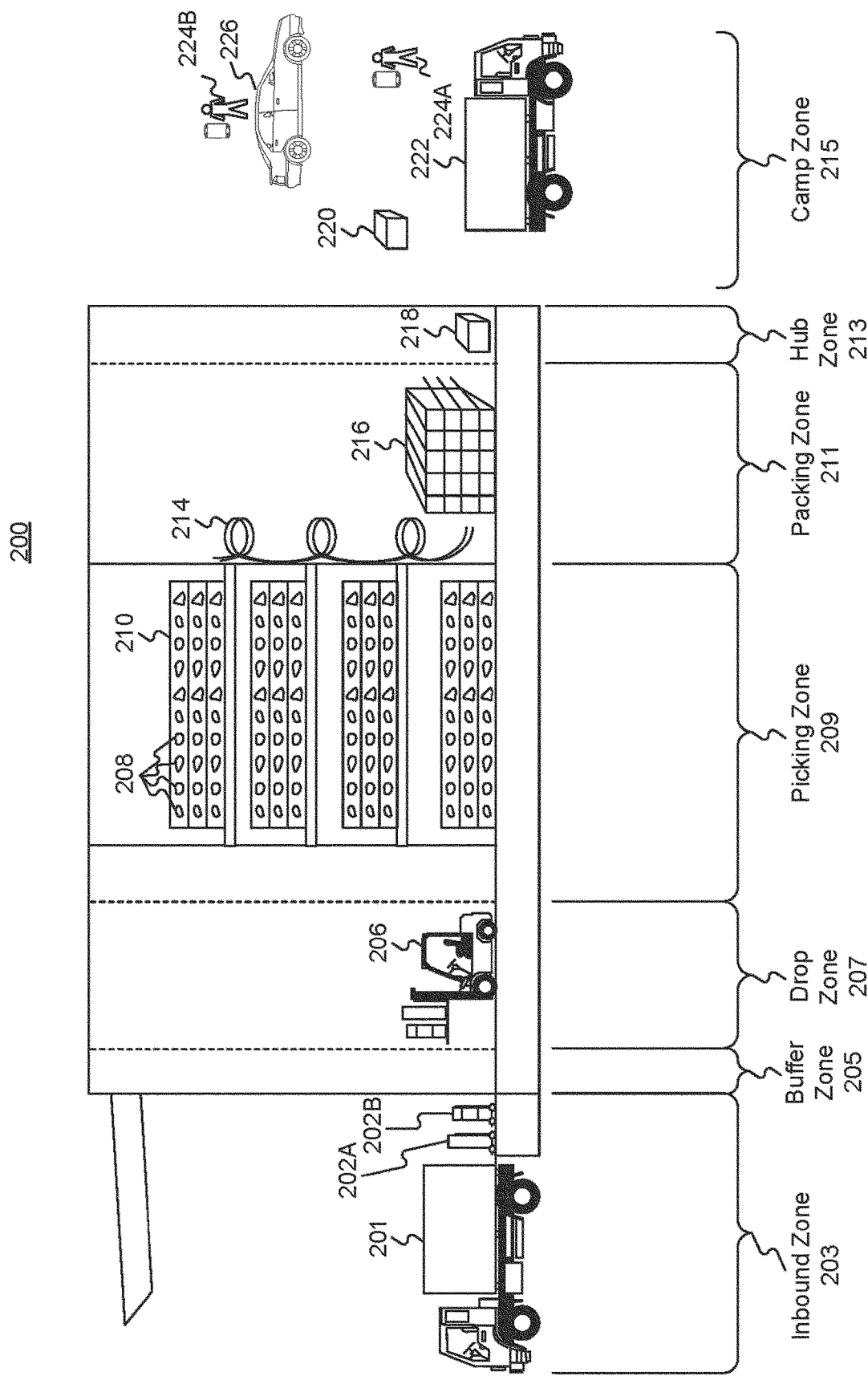
FIG. 2 is a schematic diagram of a fulfillment center that is an example of a physical location for storing items.

FIG. 2 is a schematic diagram of a fulfillment center (FC) 200 that is an example of an item storage space 20. The FC 200 is an example of a physical location that stores items for shipping to customers when ordered, and the FC 200 may be divided into multiple zones, each of which are depicted in FIG. 2.

An inbound zone 203 represents an area of the FC 200 where items are received from sellers. For example, a seller may deliver items 202A and 202B using a truck 201. The item 202A may represent a single item large enough to occupy its own shipping pallet, while item 202B may represent a set of items that are stacked together on the same pallet to save space.

A worker may receive the items in the inbound zone 203 and may check the items for damage and correctness. For example, the worker may compare the quantity of the items 202A and 202B to an ordered quantity of items, and if the quantity does match, the worker may move those items (using, e.g., a dolly, a hand truck, a forklift 206, or manually) to a buffer zone 205. The buffer zone 205 may be a temporary storage area for items that are not currently needed in a picking zone 209, for example, because there is a high enough quantity of that item in the picking zone 209 to satisfy forecasted demand.

A drop zone 207 may be an area of the FC 200 that stores items before they are moved to the picking zone 209. A worker assigned to a picking task may approach the items 202A and 202B in the picking zone 209, and scan an identifier (e.g., a barcode) for the picking zone 209, and scan identifiers associated with the items 202A and 202B using a mobile device (e.g., the user terminal 10). The worker may then take an item to the picking zone 209 by placing the item on a cart or carrying the item.

The picking zone 209 may be an area of the FC 200 where items 208 are stored on storage units 210. In particular, a user according to the present disclosure may pick up an item in the picking zone 209 to a storage unit 210 in accordance with a picking plan to create a display space, so that the item can be placed at a location assigned thereto. In some embodiments, the storage unit 210 may include one or more of physical shelving, bookshelves, boxes, totes, refrigerators, freezers, cold stores, or the like. In some embodiments, the picking zone 209 may be organized into multiple floors. Also, in some embodiments, a worker or a machine may move items to the picking zone 209 in multiple ways, including, for example, a forklift, an elevator, a conveyor belt, a cart, a hand truck, a dolly, an automated robot or device, or manually.

When a buyer places an order, a worker may retrieve one or more items 208 from the storage unit 210, scan identifiers on the items 208, and place the items 208 on a transport mechanism 214. Thereafter, the items 208 may arrive at a packing zone 211 through the transport mechanism 214.

The packing zone 211 may be an area of the FC 200 where items are received from the picking zone 209 and packed into boxes or bags for eventual shipping to a buyer. A hub zone 213 may be an area of the FC 200 that receives all packages 218 from the packing zone 211. Workers and/or machines in the hub zone 213 may retrieve the packages 218 and determine which portion of a delivery area each package is intended to go to, and route the package to an appropriate camp zone 215. In some embodiments, a worker or machine may scan an identifier of a package in the camp zone 215 to determine the eventual destination of the package. In the example illustrated in FIG. 2, the camp zone 215 includes a truck 222, a car 226, and courier workers 224A and 224B.

The present disclosure relates to, but not limited to, operations of displaying items mainly performed in the buffer zone 205 and the picking zone 209 of the FC 200.

To display an item in the FC, a worker conventionally checks a location with bare eyes and determines whether to place the item at the location. However, in many cases, it may be not possible to display an item for various reasons. That is, even if a worker determines that an empty space at a location is large enough to place an entire quantity of an item, it may not be possible to place the item in as much quantity as needed. For example, if a packaging size of an actual item is different from a size that the worker perceives, a less quantity of the item than what the worker predicted may be placed. Alternatively, there may be some cases where it is difficult to place a large quantity of an item at once because a weight of the item is heavy. In this case, it may take a long time for the worker to find another location where the item can be displayed.

In addition, the worker conventionally needs to visit and check each location to determine whether the item can be placed. Some conditions in which placement of the item is not allowed may be information that can be recognized by the worker when the worker directly visits and checks each location. For example, a quantity of an item already placed at a location may exceed a maximum quantity for the location, or the location is currently not available for use. In addition, it may be not possible to display an item at a location if a different item with the same SKU ID but a different expiration date is already placed at the location. Even in this case, it may take a lot of time for the worker to display even a small quantity of the item.

In particular, for a large-sized location, it may take more time to find a space for placing an item. For example, if a location is of a pallet type, it is necessary to scan a space larger than a small-sized location (for example, a shelf), and therefore, a worker needs more time to find a location for displaying an item. In addition, even for a location included in a zone with a high fill rate of items, it may take more time to find a space for displaying an item. This is because the higher the fill rate a location has, the more likely the location is to have been already fully filled with items, and therefore, it is more difficult to search for an empty location.

In addition, items having the same attribute should be placed at the same location as much as possible, so that task efficiency may improve when a worker carries out a picking task later. For example, if items with the same SKU ID are placed at the same location, the worker is able to pick up a larger quantity of items in the same time period in comparison with the case where items with different SKU IDs are placed at the same location. Conventionally, since it takes a long time to search for a space for displaying an item, even items with the same attribute are sometimes placed at several locations. In this case, a worker needs to go through the several locations while carrying out a picking task, thereby reducing a UPH of the picking task.

In addition, in the case of a fast selling item with a high order rate, the picking task may be frequently carried out. For this reason, the fast-selling item needs to be placed at a location where it is relatively easy to carry out the picking task. Conversely, in the case of a deadwood item with a low order rate, the picking task may be carried out very rarely. Thus, unlike the fast selling item, the deadwood item may be placed at a location without consideration of convenience of the picking task. In a related art, since a worker arbitrarily determines whether or not to place an item, a fast selling item is placed without consideration of convenience of the picking task, and therefore, it may take a relatively long time to pick up the fast selling item.

The present disclosure is directed to addressing such a drawback of the related art in an operation system for location recommendation. More specifically, the present disclosure proposes an operation system that recognizes at least one location through a series of calculations to find a location suitable for placement of an item. A detailed description thereof will be described in detail with reference to FIG. 3.

Figure 3:
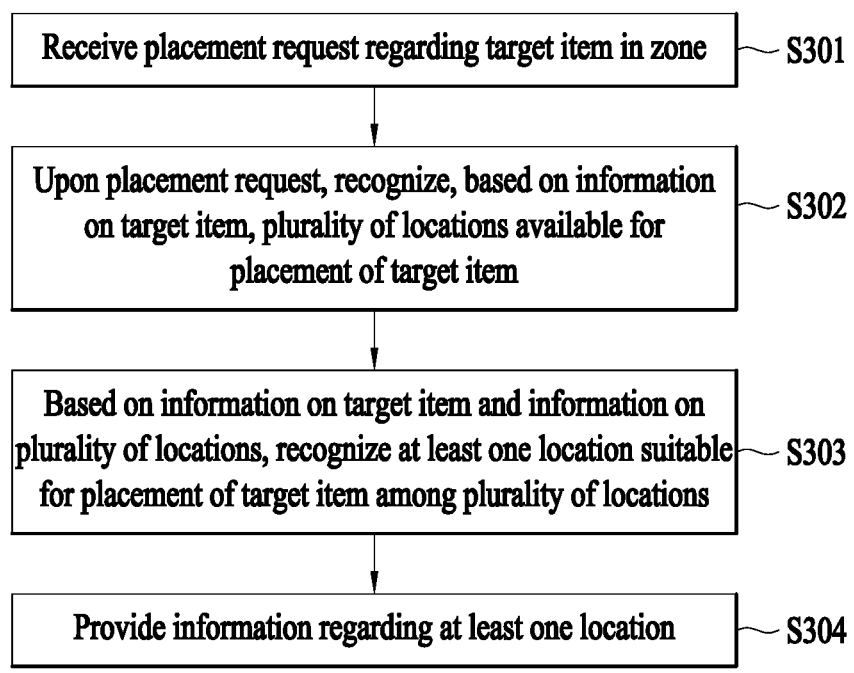
FIG. 3 is a flowchart illustrating an operation method for location recommendation according to an embodiment of the present disclosure.

FIG. 3 is a flowchart illustrating an operation method for recognizing information on at least one suitable location according to an embodiment of the present disclosure. While FIG. 3 illustrates that an operation method for location recommendation is implemented using an electronic apparatus 20, the present disclosure is not limited to the embodiment of FIG. 3 and the operation method for location recommendation may be implemented using a user terminal 10 of the present disclosure.

First, the electronic apparatus 20 may receive a placement request regarding a target item in a zone where the target item is positioned, in operation S301. At this point, the placement request may be received by the electronic apparatus 20 directly from a user or through the user terminal 10.

Based on the received placement request, the electronic apparatus 20 may know in advance some information before recommending a location for placing the item. Specifically, the user may recognize identification information for the target item to make the placement request regarding the item. In addition, the electronic apparatus 20 may be aware of some information on the target item to be placed. For example, the electronic apparatus 20 may know in advance SKU ID and expiration date-related information of the target item to recommend a location. In another embodiment, the user may recognize identification information for a storage unit, where the target item is stored, in order to make a placement request regarding the target item. In addition, the electronic apparatus 20 may know in advance the volume of the total quantity of the target item stored in the storage unit.

Next, upon the received placement request, the electronic apparatus 20 may recognize a plurality of locations available for placement of the target item in operation S302. Specifically, the plurality of locations available for placement of the target item may be recognized based on the information on the target item. Here, the information on the target item may include one or more of: identification information, weight information, size information, shipment quantity information, expiration date-related information, and prime item-related information of the target item.

For example, the identification information for the target item may include information regarding SKU ID of the target item, an identifier (for example, a barcode) of the target item, and whether the SKU ID of the target item is identified at a time of reception of the target item. The weight information may be a weight set by a manufacturer or a weight measured when the target item is received. In addition, the size information may be information including a length of one side of the target item and lengths of all sides of the target item. In addition, the shipment quantity information may refer to information indicating an amount of items ordered in an online market and shipped for delivery. The expiration date-related information may include information as to whether the target item has an expiration date, and if the target item has an expiration date, the expiration date-related information may include the expiration date of the target item. Meanwhile, if the target item is determined as an item having no expiration date according to the expiration date-related information, the information on the target item may further include information on a manufacturing date or a production date of the target item.

In addition, the prime item-related information may be information as to whether the target item corresponds to a prime item. The prime item refers to an item requiring special management among fast-selling products. For example, a high priced item, such as jewelry or a computer hardware product, is at a high risk of theft, and therefore, special management is required for such an item. In addition, even in the case of an item which can be easily picked up by a worker, such as a Lego block or a lipstick, special management is required to display the item. As described above, any item requiring special management among fast-selling items is referred to as a prime item. The prime item-related information may be identified using the SKU ID included in the identification information for the target item. In addition, a zone where such a prime item is to be placed is referred to as a prime zone.

Meanwhile, a plurality of locations available for placement of the target item may be recognized based on information on all locations in a zone. The information on all the locations may be information stored in a database of a server. In one embodiment of the present disclosure, the information on all the locations may include one or more of the following: information on relative distances between the locations in the zone, size information of each location, address information of each location, type information of each location, stack information of each location, fill rate information of each location, and prime zone-related information of each location.

The information on relative distances between the locations is information for searching for another location adjacent to one location. In addition, the size information is information about a length, a width, and a height of a corresponding location. The address information is an address made up of alphabets and numbers to represent a zone, an aisle, a bay, and/or a shelf where a corresponding location is positioned. The type information is information indicating of which type a corresponding location is among a shelf, a pallet, a pallet rack, or a rainbow. Here, the rainbow refers to a large-scale location in which a plurality of locations is connected. The stack information may include information on a volume of a stowable space of a corresponding location and information on a maximum weight of an item stowable at the corresponding location. The stowable space may refer to a maximum volume of an item that can be stowed when the corresponding location is completely empty. In addition, the fill rate information is information on how much quantity of a certain item is filled at a corresponding location. In addition, the prime zone-related information is information indicating whether a corresponding location is included in a prime zone where a prime item is to be placed.

According to an embodiment of the present disclosure, a plurality of locations satisfying a preset condition among all locations included in a zone may be recognized. Specifically, whether the plurality of locations satisfies the preset condition may be determined based on the information on all the locations and information on a target item. According to an embodiment, the preset condition may be based on one or more of the following: type information of each location, stack information of each location, attribute information of a plurality of items placed at each location, and a frequency at which information on each location is provided as information on at least one location.

Specifically, only locations having the same type as that of a location at which a user is currently positioned may be recognized as the plurality of locations. In an embodiment, a user may not have started item placement or may be waiting for recommendation for a next location after completing a task at the current location during the item placement. In the former case, if the user plans item placement at a rainbow type location and the user is positioned at the rainbow type location, a shelve type location, a pallet type location, and a pallet rack type location may be excluded from a plurality locations available for placement of an item. In the latter case, if a target item is a shower rod, the item cannot be placed at a shelf or pallet because the length of the item is long. In this case, the user may place the shower rod at a rainbow type location and may wish to keep receiving recommendation of the same location type.

In addition, locations available for placement of an item may be recognized as the plurality of locations according to location stack information. For example, if a stowable space of a location is smaller than a size of a single unit of an item, it is not possible to place the item at the location, and thus, the corresponding location cannot be recognized as one of a plurality of locations available for placement of the item. Further, if a quantity or weight of items placed at a location already reaches or exceeds a maximum value according to stack information of the corresponding location, it is not possible to place more items at the corresponding location. Therefore, even if there is an empty space at the location, the location may be excluded from the plurality of locations available for placement of the item in order to prevent too many items from being placed at the same location and reduce a worker's mistakes of picking up a wrong item.

In addition, in comparison of attribute information of a target item to be placed and attribute information of a plurality of items already placed at locations, the locations satisfying a condition for placement of the target item may be recognized as a plurality of locations available for placement of the target item. In one embodiment, if an item already placed at a location and the target item to be placed have the same identifier but different SKU IDs, the location may be excluded from a plurality of locations available for placement of the target item. For example, if a vendor for the item already placed at the location is different from a vendor for the target item to be placed, the two items may have the same barcode but different SKU IDs. In this case, the two items cannot be placed at the same location.

In another embodiment, in the case of items having expiration dates, if an item already placed at a location and a target item to be placed have the same SKU ID but different expiration dates, the location may be excluded from a plurality of locations available for placement of the target item. That is, the items having the same expiration date are allowed to be placed at the same location.

In addition, in one embodiment, when a target item is a prime item, the locations where prime items are placed may be recognized as a plurality of locations available for placement of the target item. That is, a location may be recommended so that prime items can be placed together as much as possible. Alternatively, when a target item is a prime item, the locations included in a prime zone may be recognized as a plurality of locations available for placement of the target item. In other words, when the target item is a prime item, a location not included in the prime zone may be excluded from the plurality of locations available for placement of the target item.

Also, when information on a location is recommended within a preset time period, the location may be excluded from the plurality of locations available for placement of the target item. For example, a location recommended to another worker within the last one minute is excluded from the plurality of locations available for placement of the target item, so that the location cannot be recommended again. This is to prevent multiple workers from gathering at one location.

In one embodiment, the locations currently not unavailable may be recognized as a plurality of locations available for placement of the target item. For example, when a location is closed, broken, or dirty due to an unpleasant substance, the location may be considered unavailable. Such information on availability of a location may be pre-stored in a database of a server, and the electronic apparatus 20 may take into consideration the above-described information when recognizing a plurality of locations available for placement of the target item.

Next, based on information on the target item and information on the plurality of locations, the electronic apparatus 20 according to the present disclosure may recognize at least one location suitable for placement of the target item in operation S303. According to an embodiment, the electronic apparatus 20 may recognize at least one location by considering a volume of the target item stored in the storage unit and a volume of each of the plurality of locations. For a specific embodiment thereof, a description of FIG. 4 may be referred to.

Meanwhile, the electronic apparatus 20 according to another embodiment of the present disclosure may recognize at least one location suitable for placement of a target item among a plurality of locations based on respective positions of the plurality of locations. For example, a location at a short relative distance from a spot where a worker is currently positioned, that is, a spot where a storing unit with a target item stored therein is positioned may be recognized as a location suitable for placement of the target item. In addition, the electronic apparatus 20 may continuously provide information on locations in order starting from a location having a short relative distance to a position where the worker is currently positioned, so that the worker can continuously perform item placement.

Specifically, in operation S304, the electronic apparatus 20 may provide the user with information on at least one location recognized in operation S303. The information on the at least one location may be provided to the user directly from the electronic apparatus 20 or may be transmitted to the user terminal 10 and then provided to the user through the user terminal 10. Information on a location provided to the user may include address information indicating where the location is positioned. In addition, the user may move to the position of the location, provided through the address information, and perform placement of the target item.

Figure 4:
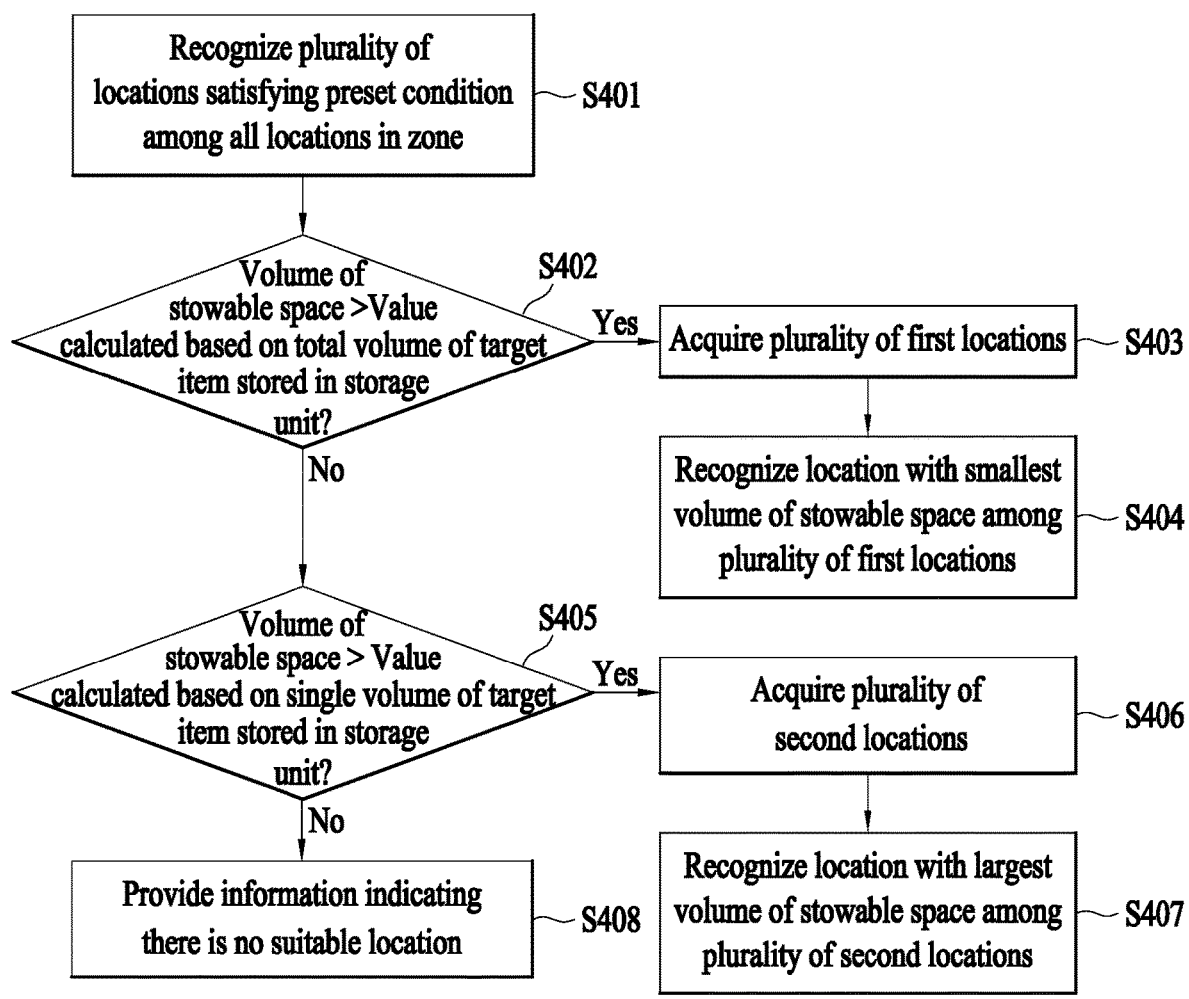
FIG. 4 is a flowchart illustrating an operation method for recognizing information on at least one suitable location according to an embodiment of the present disclosure.

FIG. 4 is a flowchart illustrating an operation method for recognizing information on at least one suitable location according to an embodiment of the present disclosure.

The electronic apparatus 20 of the present disclosure may recognize a plurality of locations satisfying a preset condition from all locations included in a zone in operation S401. Based on at least one of information on all the locations and information on a target item, the electronic apparatus 20 may recognize locations satisfying a preset condition among all the locations as a plurality of locations available for placement of the target item. Regarding the above operation, the description about operation S302 of FIG. 3 may be referred to avoid repetition of the description.

Next, the electronic apparatus 20 according to an embodiment may recognize at least one location among the plurality of locations by considering a volume of a stowable space of each of the plurality of locations and a volume of the target item stored in a storage unit. Specifically, the electronic apparatus 20 may determine whether a volume of a stowable space of any location among the plurality of locations is greater than a value calculated based on a total volume of the target item stored in the storage unit in operation S402. Hereinafter, operation S402 will be described as an operation for determining as to whether the plurality of locations satisfies a first condition.

In one embodiment of the present disclosure, the calculated value in the first condition may be a value obtained by multiplying the total volume of the target item stored in the storage unit by a preset value. In operation S402, the reason why, instead of the total volume of the target item, the value obtained by multiplying the total volume of the target item stored in the storage unit by the preset value is taken into consideration is because a probability of damage to the item and degrade efficiency of picking tasks may increase if a space of a location is fully filled with items. For example, the above calculated value may be a value obtained by multiplying the total volume of the target item stored in the storage unit by 1.2. In this case, operation S402 may be an operation for determining whether a volume of a stowable space of any location among the plurality of locations is greater than a value obtained by multiplying the total volume of the target item stored in the storage unit by 1.2. The preset value may be stored in the server for location recommendation and it is not limited to the aforementioned constant value.

Meanwhile, the electronic apparatus 20 may perform operation S402 on a location corresponding to an address position falling within the same range as that of a location where a user is currently positioned, and may acquire locations satisfying the first condition as a plurality of first locations in operation S403. However, if all the plurality of locations does not satisfy the condition of operation S402, the electronic apparatus 20 may expand the address position and perform operation S402 on a location corresponding to the expanded address position. For example, whether any location positioned in the same bay as that of the current position among the plurality of locations satisfy the first condition may be determined. Then, if there is no location satisfying the first condition among locations positioned in the same bay, the electronic apparatus 20 may expand an address position and determine whether any location positioned in the same aisle satisfies the first condition.

The electronic apparatus 20 of the present disclosure may recognize a location having a smallest volume of a stowable space among the plurality of first locations as at least one location suitable for placement of the target item in operation S404. In one embodiment, after completing item placement with respect to at least one location provided from the electronic apparatus 20, a user may wish to further perform the item placement. In this case, except for a location in which the item placement is completed, the electronic apparatus 20 will provide information on a location having a next smallest volume of a stowable space among the plurality of first locations. In other words, the electronic apparatus 20 may provide information on locations in order starting from a location having a smallest volume of a stowable space among the plurality of first locations.

Meanwhile, despite the operation for determining as to whether any location corresponding to an expanded address position satisfies the first condition, if no location is determined to satisfy the first condition, the electronic apparatus 20 may perform operation S405.

In operation S405, the electronic apparatus 20 may determine whether a volume of a stowable space of any location among the plurality of locations is greater than a value calculated based on a single volume of the target item stored in the storage unit. Hereinafter, operation S405 will be described as an operation for determining whether the plurality of location satisfies a second condition.

In one embodiment of the present disclosure, the calculated value in the second condition may be a value obtained by multiplying a single volume of the target item stored in the storage unit by a preset value. For example, the above calculated value may be a value obtained by multiplying the single volume of the target item stored in the storage unit by 1.2. In this case, operation S405 may be an operation for determining whether a volume of a stowable space of any location among the plurality of locations is greater than the value obtained by multiplying the single volume of the target item stored in the storage unit by 1.2. Likewise as in operation S402, the preset value may be pre-stored in the server for location recommendation and it is not limited to the above constant value.

Meanwhile, the electronic apparatus 20 may perform operation S405 while expanding an address position. For example, although the electronic apparatus 20 performs operation S405 with respect to a location corresponding to an address position falling within the same range as that of a location where a user is currently positioned, if no location satisfies the second condition, the electronic apparatus 20 may expand an address position and perform operation S405. For example, whether any location positioned in the same bay as that of a location where a user is currently positioned among the plurality of locations satisfies the second condition may be determined. Then, if there is no location satisfying the second condition among locations positioned in the same bay, the electronic apparatus 20 may expand an address position and determine whether any location positioned in the same aisle satisfies the second condition. If no location positioned in the same aisle satisfies the second condition, the electronic apparatus 20 may perform operation S405 with respect to all the locations included in the zone.

According to an embodiment, a range of determination as to the second condition may be different according to a location type. For example, if the location type is a shelf or a rainbow, whether the second condition is satisfied may be determined with respect to locations positioned in the same zone as that of a current position. In another example, if the location type is a pallet or a pallet rack, whether the second condition is satisfied may be determined with respect to a location positioned in an adjacent zone belonging to the same floor as that of the current position.

Next, the electronic apparatus 20 may acquire locations satisfying the second condition as a plurality of second locations in operation S406. In addition, a location having a largest volume of a stowable space among the plurality of second locations may be recognized as at least one location suitable for placement of the target item in operation S407. In one embodiment, after completing the item placement with respect to at least one location provided from the electronic apparatus 20, a user may wish to further perform item placement. In this case, except for a location in which the item placement is completed, the electronic apparatus 20 will provide information on a location having a next largest volume of a stowable space among the plurality of second locations. In other words, the electronic apparatus 20 may provide information on locations in order starting from a location having a largest volume of a stowable space among the plurality of second locations.

Meanwhile, even though the electronic apparatus 20 performs operation S405 with respect up to a location positioned in a zone identical or adjacent to a zone where the user is currently positioned, it may be determined that there is no location satisfying the second condition. In such a case, the electronic apparatus 20 is not able to recommend a location any longer, and therefore, information on any location may not be provided to the user. At this point, the electronic apparatus 20 may provide information indicating that there is no suitable location in operation S408. For example, the electronic apparatus 20 may transmit, to the user terminal 10, information indicating that there is no location suitable for placement of the target item. Then, a message indicating that location recommendation is not available may be displayed through the user terminal 10.

According to another embodiment of the present disclosure, the electronic apparatus 20 may recognize at least one location suitable for placement of the target item among a plurality of locations, by further taking into consideration an attribute of the target item.

Specifically, the electronic apparatus 20 of the present disclosure may recognize a plurality of locations available for placement of the target item based on information on the target item, and may recognize at least one location suitable for placement of the target item among the plurality of locations. The information on the target item may represent an attribute of the target item. For example, the information on the target item may include one or more of the following: size information, shipment quantity information, expiration date-related information, and prime item-related information of the target item.

According to an embodiment, the electronic apparatus 20 may recognize at least one location by considering an area in which the target item is to be placed according to the size information of the target item. For example, for an item classified as having a small size, the electronic apparatus 20 may allow the item to be placed at a small-sized location. For instance, a lip balm may be classified as a small-sized item and it may be preferable to place the lip balm in a bin type small-sized location in a shelf.

In another example, the electronic apparatus 20 may recognize at least one location by considering a height at which the target item is to be placed according to the shipment quantity information of the target item. For instance, an item with a high shipment quantity may be placed at a location on the side of an aisle so that a worker can pick up the item quickly. An item which is constantly ordered despite a very high shipment quantity may be placed at an eye-level location (for example, a two or four-stage shelf), so that a worker can conveniently pick up the item. Meanwhile, an item with a low shipment quantity may be placed at various locations positioned at the top or the bottom. In this case, considering a weight and a volume of each item, a heavy and bulky item may be placed at the bottom and a relatively light and small item may be placed at the top.

In another embodiment, the electronic apparatus 20 may recognize at least one location by considering expiration date-related information or prime item-related information of the target item and information on items already placed at a plurality of locations. For example, an item without an expiration date may not be placed at a location where an item with an expiration date is placed. Likewise, items with close expiration dates may be placed together. In addition, a prime item may be placed at a location in a prime zone where prime items are to be placed.

The operation system for location recommendation according to the present disclosure may increase stowage efficiency of a location by increasing a UPH of a stowing task and shortening movement of a worker.

Meanwhile, when it comes to an operation of the electronic apparatus 20 to provide at least one location suitable for placement of a target item upon a placement request regarding the target item, the user terminal 10 of the present disclosure may also perform an operation for location recommendation.

The user terminal 10 of the present disclosure according to an embodiment may receive an input of the request for placement of the target item from a user. In this case, in order to make the placement request, the user may input prior information. For example, the user may recognize identification information for the target item and identification information for a storage unit in which the target item is stored. In doing so, the user terminal 10 is able to identify the target item, and a required quantity of the target item to be placed.

Upon the received input of the placement request, the user terminal 10 may recognize, based on information on the target item, a plurality of locations available for placement of the target item. Further, the user terminal 10 may recognize at least one location suitable for placement of the target item among the plurality of locations and may output information on the at least one location.

Figure 5:
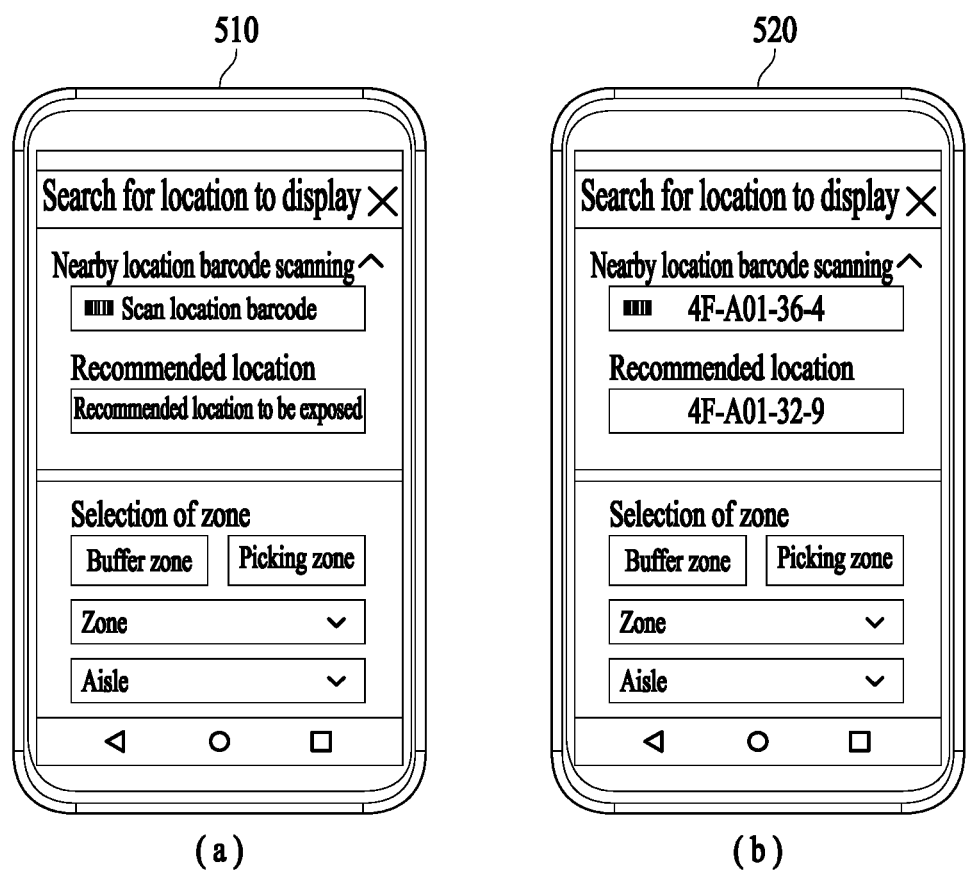
FIG. 5 is a schematic diagram of a display screen according to an embodiment where a user terminal of the present disclosure receives an input of identification information for a location.

FIG. 5 is a schematic diagram of a display screen according to an embodiment where the user terminal 10 of the present disclosure receives an input of identification information for a location.

A graphic user interface (GUI) 510 in (a) of FIG. 5 shows a screen for receiving an input of identification information for a location corresponding to a spot where a user is currently positioned. That is, the GUI 510 is a screen for receiving an input of identification information for a location corresponding to a spot where a storage unit with a target item stored therein is positioned. For example, the user terminal 10 may scan a barcode of a location to identify a location where the user is currently positioned.

A GUI 520 in (b) of FIG. 5 shows a screen for outputting information on at least one location that is recognized based on the input of the identification information for the location of the spot where the storage unit is positioned. Upon the input of the identification information received in the GUI 510, the user terminal 10 may output address information of the location where the user is currently positioned. In addition, the user terminal 10 may output address information on at least one location. In one embodiment, the user terminal 10 may display information on a location which is positioned at a spot closest to the spot of the storage unit with the target item stored therein among a plurality of locations available for placement of the target item. In this case, information on at least one location may be information received from the electronic apparatus 20 or may be information recognized by a controller of the user terminal 10.

Figure 6:
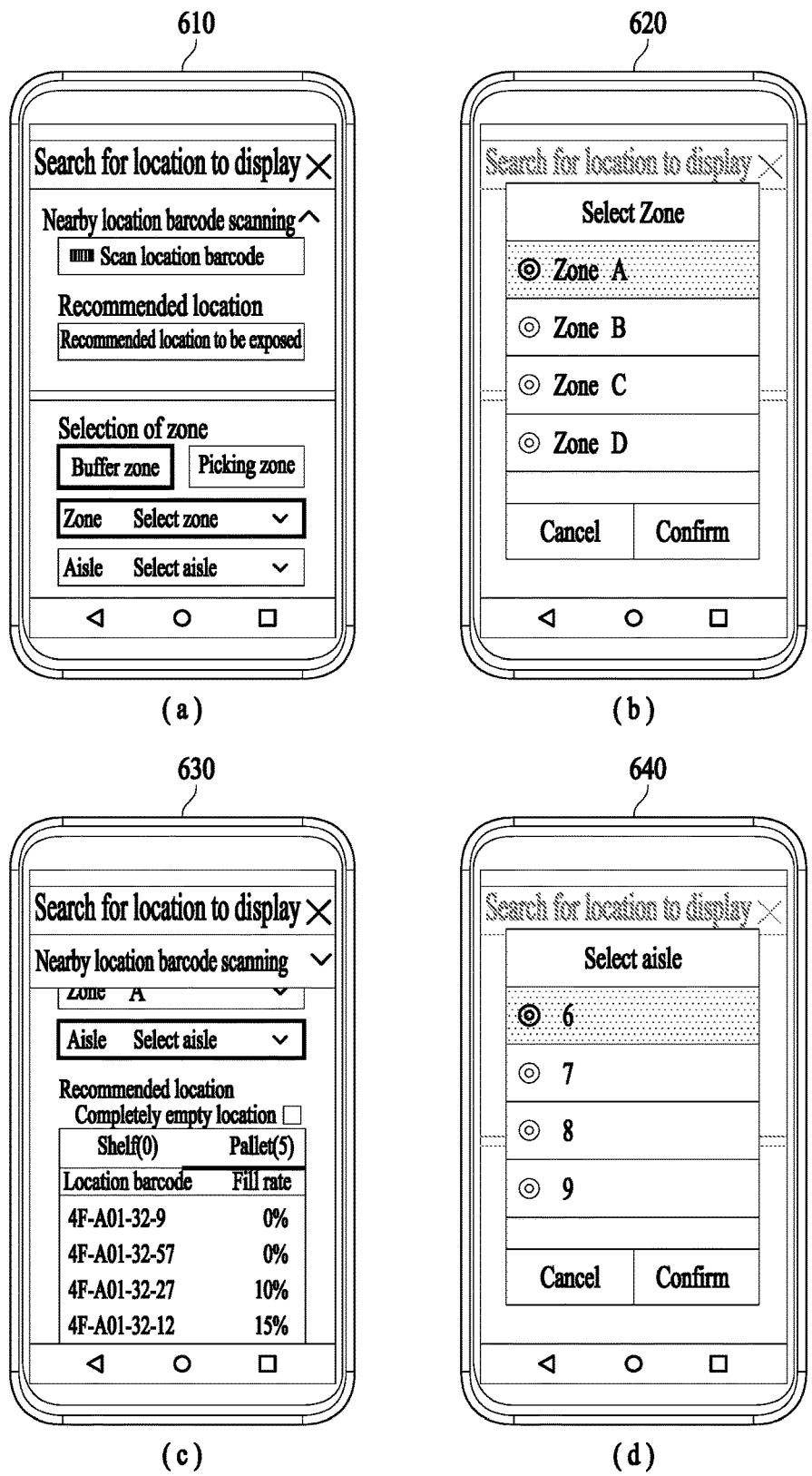
FIG. 6 is a schematic diagram of a display screen according to an embodiment where a user terminal of the present disclosure receives an input of a range for a plurality of locations.

According to an embodiment of the present disclosure, location recommendation for the user may be performed based on the current position of the user or by setting a range of locations. FIG. 6 is a schematic diagram of a display screen according to an embodiment where the user terminal 10 of the present disclosure receives an input of a range for a plurality of locations.

According to FIG. 6, the user terminal 10 may receive an input of a range for a plurality of locations available for placement of a target item. A GUI 610 in (a) of FIG. 6 shows a screen for setting a type of zone for placing the target item. For example, a user may select either a buffer zone or a picking zone.

A GUI 620 in (b) of FIG. 6 shows a screen for selecting a sub-zone where the target item is to be placed. Through the user's input for setting a zone for placing a target item, the user terminal 10 may recognize a location suitable for placement of the target item from a plurality of locations included in the input zone. For example, the user may select zone A from a list of sub-zones of the buffer zone. In this case, the user terminal 10 may recognize a location suitable for placement of the target item from a plurality of locations included in a buffer A zone.

A GUI 630 in (c) of FIG. 6 shows a screen for outputting at least one location suitable for placement of the target item in the zone selected in the GUI 620. Specifically, the GUI 630 is a screen that lists information on one or more locations suitable for placement of the target item among a plurality of locations within the selected zone. For example, the user terminal 10 may list address information of locations of each type. In addition, the user terminal 10 may further display a fill rate of an item placed at each location or an available quantity of an item to be placed at each location. For example, information on locations may be listed in order starting from a location with a smallest fill rate among one or more locations suitable for placement of the target item.

While the GUI 630 of the present disclosure is described as listing information on locations of a shelf or pallet type, the present disclosure is not limited thereto and information on locations of a different type may be output.

In addition, the user terminal 10 may receive an input for setting an aisle as a more detailed range compared to a zone. A GUI 640 in (d) of FIG. 6 shows a screen for setting an aisle for placing a target item. Through the user's input for setting an aisle for placing the target item, the user terminal 10 may recognize a location suitable for placement of the target item among a plurality of locations included in the input aisle. For example, the user may select Aisle No. 6 from a list of aisles in the buffer A zone. In this case, the user terminal 10 may recognize a location suitable for placement of the target item among a plurality of locations included in Aisle No. 6 of the buffer A zone. In addition, as in the case where the zone is set, the user terminal 10 may list information on one or more locations suitable for placement of the target item among the plurality of locations included in the set aisle.

In one embodiment, there may be only one location type suitable for placement of the target item. In this case, information on at least one location of one type may be listed, and information on locations of other types may be inactivated and thus not available to a user. For example, if locations of shelf type are recognized as locations suitable for placement of the target item and locations of pallet type are recognized as not suitable, information on the locations of the shelf type may be listed.

In another embodiment, if locations of various types are recognized as suitable for placement of the target item, information on locations of one type having a largest number of locations recognized as suitable may be preferentially listed.

Meanwhile, if not even one location is not recognized as suitable for placement of the target item, an electronic message indicating that it is not possible to recommend a location may be displayed. In present embodiment, the electronic message may show "Not able to recommend" or "No location to recommend", and may include an alert. An electronic message including an alert may inform a user, through color, font size, and/or sound, that there is no location to recommend.

According to an embodiment of the present disclosure, the user terminal 10 may receive an input of identification information for a location from the user, but the location may not satisfy a preset condition. In this case, the user may not be able to place the target item at the corresponding location. Such a situation may take place when no location has been recommended for the user and the user inputs identification information for a particular location in order to place the target item at the particular location. Alternatively, the aforementioned situation may be a situation where, after a location is recommended, the user is not able to place the target item at the recommended location because a status of the location changes in real time.

The preset condition is a condition that is based on one or more of the following: type information of each location, stack information of each location, attribute information of a plurality of items placed at each location, and a frequency at which information on each location is provided as information on at least one location. For a detailed description thereof, the description of operation S302 in FIG. 3 may be referred to.

Figure 7:
FIG. 7 is a schematic diagram of a display screen according to an embodiment where a user terminal of the present disclosure displays an electronic message including information on at least one location.

FIG. 7 is a schematic diagram of a display screen according to an embodiment where the user terminal 10 of the present disclosure displays information on at least one location. A GUI 710 of FIG. 7 shows a screen that displays an electronic message including information on at least one location suitable for placement of a target item.

According to an embodiment, when a location coinciding with location identification information input by a user does not satisfy a preset condition, the user terminal 10 may receive the input of the identification information for the location not satisfying the preset condition as an input for placement request regarding the target item. Then, the user terminal 10 may acquire a position of the location based on the received identification information as a spot where the user is currently positioned. Accordingly, the user terminal 10 may recognize at least one location suitable for placement of the target item and display an electronic message 711 including information on the at least one location. For example, the electronic message 711 may include address information for one location to recommend. In addition, the user may move to the location based on the address information shown in the electronic message 711 to proceed with item placement.

Figure 8:
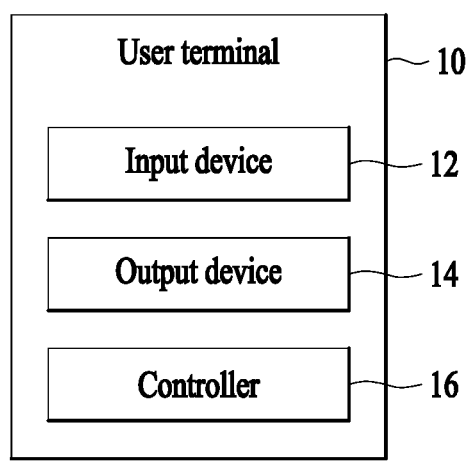
FIG. 8 is a block diagram of a user terminal according to an embodiment of the present disclosure.

FIG. 8 is a block diagram of the user terminal 10 according to an embodiment of the present disclosure.

The user terminal 10 of the present disclosure may include an input device 12, an output device 14 and a controller 16 according to an embodiment. The components illustrated in FIG. 8 are not essential to implement a terminal, and thus, it will be apparent to those skilled in the art that more or fewer components may be employed.

The input device 12 may include a camera or an image input device for inputting an image signal, a microphone or an audio input device for inputting an audio signal, and a user input device (for example, a touch key, a push key (a mechanical key) and the like). In addition, the input device 12 may include one or more sensors configured to sense at least one of: internal information of a mobile terminal, information on an environment in the surroundings of the mobile terminal, or user information. For example, the input device 12 may include at least one of a proximity sensor, an illumination sensor, a touch sensor, a motion sensor, a finger scan sensor, an optical sensor (for example, a camera), a microphone, and the like. Meanwhile, the mobile terminal of the present disclosure may utilize information obtained from at least two or more of these sensors.

According to one embodiment, the input device 12 may receive an input of a placement request regarding a target item. For example, the input device 12 may receive an input of identification information for a location corresponding to a spot where a storage unit with the target item stored therein is positioned. Further, the input device 12 may receive an input of a range for a plurality of locations. Specifically, the input device 12 may receive an input for selecting a zone and/or aisle. Also, the input device 12 may receive an input of identification information for a location. For example, the input device 12 may receive an input of identification information for a location that does not satisfy a preset condition.

The output device 14 is configured to generate an output related to visual, auditory, tactile senses, and may include at least one of a display device, an audio output device, a haptic module, and an optical output device. The output device 14 may provide an output interface between the user terminal 10 and a user. According to an embodiment, the output device 14 may output information on at least one location.

The controller 16 may control overall operations of the user terminal 10 and process data and signals. According to one embodiment, the controller 16 may control operations of the input device 12 and the output device 14 in order to recognize at least one location suitable for placement of a target item. Specifically, the controller 16 may receive an input of a placement request regarding the target item through the input device 12. Then, the controller 16 may output information on at least one location through the output device 14.

In addition, upon the input of the placement request, the controller 16 may recognize, based on information on the target item, a plurality of locations where the target item can be placed. Then, based on the information on the target item and information on the plurality of locations, the controller 16 may recognize at least one location suitable for placement of the target item among the plurality of locations. In this case, the controller 16 of the user terminal 10 may acquire the plurality of locations and determine at least one location suitable for arranging a target item among the plurality of acquired locations. Alternatively, the controller 16 may receive the information on the plurality of locations and information on at least one location from the electronic apparatus 20.

Meanwhile, although not illustrated in FIG. 8, the user terminal 10 may further include a communication device that communicates with the electronic apparatus 20. The communication device may communicate with an external electronic apparatus using a wired/wireless communication technology. The external electronic apparatus may be a terminal or a server. In addition, the communication technology used by the communication device may include, but not limited to, Global System for Mobile Communication (GSM), Code Division Multi Access (CDMA), Long Term Evolution (LTE), 5G, Wireless LAN (WLAN), Wireless-Fidelity (Wi-Fi), Bluetooth™, Radio Frequency Identification (RFID), Infrared Data Association (IrDA), ZigBee, Near Field Communication (NFC), and the like.

According to one embodiment, the communication device may transmit a placement request regarding a target item to the electronic apparatus 20. In addition, the communication device may receive information on at least one location suitable for placement of the target item from the electronic apparatus 20.

Figure 9:
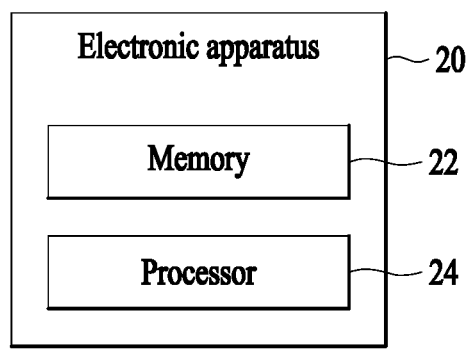
FIG. 9 is a block diagram of an electronic apparatus according to an embodiment of the present disclosure.

FIG. 9 is a block diagram of the electronic apparatus 20 according to an embodiment of the present disclosure.

The electronic apparatus 20 of the present disclosure may include a memory 22 and a processor 24 according to an embodiment. The components illustrated in FIG. 9 are not essential to implement an electronic apparatus, and thus, it will be apparent to those skilled in the art that more or fewer components may be employed.

The memory 22 may store data that supports various functions of the electronic apparatus 20. The memory 22 may store a plurality of application programs (or applications) executable on the electronic apparatus 20, data and instructions for operations of the electronic apparatus 20. At least some of the application programs may be downloaded from an external server via wireless communication. Meanwhile, the application programs may be stored in the memory 22 and installed on the electronic apparatus 20 and may be executed by the processor 24 to perform an operation (or a function) of the electronic apparatus.

The processor 24 may control overall operations of the electronic apparatus 20 and execute the application programs stored in the memory 22. According to an embodiment, upon receiving a placement request regarding a target item, the processor 24 may recognize, based on information on the target item, a plurality of locations available for placement of the target item. In addition, the processor 24 may recognize at least one location suitable for placement of the target item among the plurality of locations.

The apparatus described herein may include a permanent storage such as a disk drive, a communication port for handling communications with external devices, and user interface devices such as a touch panel, a key, and a button. The methods that are implemented as software modules or algorithms may be stored as program instructions or computer-readable codes executable by the processor on a computer-readable recording medium. Here, examples of the computer-readable recording medium include magnetic storage media (e.g., read only memory (ROM), random access memory (RAM), floppy disk, or hard disk), optically readable media (e.g., compact disk-read only memory (CD-ROM) or digital versatile disk (DVD)), etc. The computer-readable recording medium may be distributed over network coupled computer systems, and thus, the computer-readable code may be stored and executed in a distributed fashion. This medium may be read by the computer, stored in the memory, and executed by the processor.

The present embodiments may be described in terms of functional block components and various processing steps. Such functional blocks may be realized by any number of hardware and/or software components configured to perform specified functions. For example, embodiments may employ various integrated circuit (IC) components, e.g., memory elements, processing elements, logic elements, look-up tables, and the like, which may carry out a variety of functions under the control of one or more microprocessors or other control devices. Similarly, where the elements are implemented using software programming or software elements, the present embodiments may be implemented with any programming or scripting language such as C, C++, Java, assembler language, or the like, with the various algorithms being implemented with any combination of data structures, objects, processes, routines or other programming elements. Functional aspects may be implemented in algorithms that are executed on one or more processors. Furthermore, the embodiments described herein could employ any number of conventional techniques for electronics configuration, signal processing and/or control, data processing and the like. The terms "mechanism," "element," "means," and "configuration" are used broadly and are not limited to mechanical or physical embodiments. Those terms may include software routines in conjunction with processors, etc.

The above-described embodiments are only examples, and other embodiments may be implemented within the scope of the following claims.

What is claimed is:

1. An operation method of an electronic apparatus, comprising:

receiving, by the electronic apparatus via a graphical user interface of a user terminal, a placement request regarding a target item in a zone, wherein the zone comprises locations;

receiving, by the electronic apparatus via the graphical user interface of the user terminal, a range identifier identifying a portion of the zone for placement of the target item, wherein the range identifier is indicative of a subset of the locations within the zone that are eligible for placement of the target item;

based upon receiving the placement request and receiving the range identifier, determining, by the electronic apparatus, the subset of the locations eligible for placement of the target item;

obtaining, by the electronic apparatus, location type information for placement of the target item, wherein the location type information is indicative of a characteristic of one or more locations that are suitable for placement of the target item;

determining, by the electronic apparatus, for each location of the subset of the locations, one or more particular items stored at a particular location;

comparing, by the electronic apparatus, for each location of the subset of the locations, the one or more particular items stored at the particular location and the target item;

based on comparing the target item and the one or more particular items for each location of the subset of the locations, identifying, by the electronic apparatus, from the subset of the locations, a portion of the subset of the locations, wherein the portion of the subset of the locations are associated with a plurality of location types, wherein each location type of the plurality of location types identifies a characteristic of one or more corresponding locations of the portion of the subset of the locations;

comparing, by the electronic apparatus, the location type information for placement of the target item and the plurality of location types;

based on comparing the location type information for placement of the target item and the plurality of location types, determining, by the electronic apparatus, at least one location of the portion of the subset of the locations suitable for placement of the target item, wherein a location type of the at least one location matches the location type information for placement of the target item;

providing, by the electronic apparatus, information regarding the at least one location to the user terminal, wherein the user terminal is configured to output the information regarding the at least one location via the graphical user interface; and based at least in part on the information regarding the at least one location, causing, by the electronic apparatus, an automated device to move the target item to the at least one location.

2. The operation method of claim 1,
wherein the target item corresponds to target item information comprising one or more of:
identification information,
weight information,
size information,
shipment quantity information,
expiration date-related information, or
prime item-related information of the target item,
wherein the determining the subset of the locations eligible for placement of the target item is further based upon the target item information and information regarding the subset of the locations, wherein the information regarding the subset of the locations comprises one or more of:
information regarding relative distances between one or more locations of the subset of the locations,
size information of each location of the subset of the locations,
address information of each location of the subset of the locations,
type information of each location of the subset of the locations,
stack information of each location of the subset of the locations,
fill rate information of each location of the subset of the locations, or
prime zone-related information of each location of the subset of the locations.

3. The operation method of claim 1, wherein the determining of the at least one location comprises determining a location of the portion of the subset of the locations, the location positioned closest to a storage unit storing the target item.

4. The operation method of claim 1,
wherein the determining of the subset of the locations comprises, based on information associated with the locations in the zone, determining the subset of the locations of the locations in the zone, wherein the subset of the locations satisfy a preset condition, wherein the preset condition is based on one or more of:
a location type of each location of the locations in the zone,
stack information of each location of the locations in the zone,
attribute information of a plurality of items placed at each location of the locations in the zone, or
a frequency at which information regarding each location of the locations in the zone is provided as the information regarding the at least one location.

5. The operation method of claim 1, wherein the determining of the at least one location comprises determining the at least one location of the portion of the subset of the locations based at least in part on comparing a volume of stowable space for each location of the portion of the subset of the locations and a volume of the target item stored in a storage unit.

6. The operation method of claim 5, wherein the determining of the at least one location further comprises:
determining a plurality of first locations of the portion of the subset of the locations, each location of the plurality of first locations corresponding to a particular volume of stowable space greater than the volume of the target item stored in the storage unit; and
determining a particular first location of the plurality of first locations having a smallest volume of stowable space.

7. The operation method of claim 5, wherein the determining of the at least one location further comprises:
determining a plurality of second locations of the portion of the subset of the locations, each location of the plurality of second locations corresponding to a particular volume of stowable space greater than the volume of the target item stored in the storage unit; and
determining a particular second location of the plurality of second locations having a largest volume of stowable space.

8. The operation method of claim 1,
wherein information corresponding to the target item comprises one or more of:
size information of the target item, or
shipment quantity information of the target item, and
wherein the determining of the at least one location comprises determining the at least one location based on one or more of:
an area in which the target item is to be placed according to the size information of the target item, or
a height at which the target item is to be placed according to the shipment quantity information of the target item.

9. The operation method of claim 8,
wherein information corresponding to the target item further comprises:
expiration date-related information of the target item, or
prime item-related information of the target item, and
wherein the determining of the at least one location comprises determining the at least one location further based on comparing one or more of:
the expiration date-related information of the target item and information corresponding to items already placed at each location of the portion of the subset of the locations, or
the prime item-related information of the target item and information corresponding to items already placed at each location of the portion of the subset of the locations.

10. A non-transitory computer-readable recording medium having recorded thereon a program, which, when executed by a computer, causes the computer to:
- receive, by the computer via a graphical user interface of a user terminal, a placement request regarding a target item in a zone, wherein the zone comprises locations;
- receive, by the computer via the graphical user interface of the user terminal, a range identifier identifying a portion of the zone for placement of the target item, wherein the range identifier is indicative of a subset of the locations within the zone that are eligible for placement of the target item;
- based upon receiving the placement request and receiving the range identifier, determine, by the computer, the subset of the locations eligible for placement of the target item;
- obtain, by the computer, location type information for placement of the target item, wherein the location type information is indicative of a characteristic of one or more locations that are suitable for placement of the target item;
- determine, by the computer, for each location of the subset of the locations, one or more particular items stored at a particular location;
- compare, by the computer, for each location of the subset of the locations, the one or more particular items stored at the particular location and the target item;
- based on comparing the target item and the one or more particular items for each location of the subset of the locations, identify, by the computer, from the subset of the locations, a portion of the subset of the locations, wherein the portion of the subset of the locations are associated with a plurality of location types, wherein each location type of the plurality of location types identifies a characteristic of one or more corresponding locations of the portion of the subset of the locations;
- compare, by the computer, the location type information for placement of the target item and the plurality of location types;
- based on comparing the location type information for placement of the target item and the plurality of location types, determine, by the computer, at least one location of the portion of the subset of the locations suitable for placement of the target item, wherein a location type of the at least one location matches the location type information for placement of the target item;
- provide, by the computer, information regarding the at least one location to the user terminal, wherein the user terminal is configured to output the information regarding the at least one location via the graphical user interface; and
- based at least in part on the information regarding the at least one location, cause, by the computer, an automated device to move the target item to the at least one location.

11. An electronic apparatus, comprising:
a memory configured to store an instruction; and
a processor configured to execute the instruction,
wherein the processor is further configured to:
- upon receiving a placement request regarding a target item in a zone via a graphical user interface of a user terminal and upon receiving a range identifier identifying a portion of the zone for placement of the target item, recognize, by the processor of the electronic apparatus, a subset of locations eligible for placement of the target item, wherein the zone comprises the locations, wherein the range identifier is indicative of a subset of the locations within the zone that are eligible for placement of the target item;
- obtain, by the processor of the electronic apparatus, location type information for placement of the target item, wherein the location type information is indicative of a characteristic of one or more locations that are suitable for placement of the target item;
- determine, by the processor of the electronic apparatus, for each location of the subset of the locations, one or more particular items stored at a particular location;
- compare, by the processor of the electronic apparatus, for each location of the subset of the locations, the one or more particular items stored at the particular location and the target item;
- based on comparing the target item and the one or more particular items for each location of the subset of the locations, identify, by the processor of the electronic apparatus, from the subset of the locations, a portion of the subset of the locations, wherein the portion of the subset of the locations are associated with a plurality of location types, wherein each location type of the plurality of location types identifies a characteristic of one or more corresponding locations of the portion of the subset of the locations;
- compare, by the processor of the electronic apparatus, the location type information for placement of the target item and the plurality of location types;
- based on comparing the location type information for placement of the target item and the plurality of location types, determine, by the processor of the electronic apparatus, at least one location of the portion of the subset of the locations suitable for placement of the target item, wherein a location type of the at least one location matches the location type information for placement of the target item;
- provide, by the processor of the electronic apparatus, information regarding the at least one location to the user terminal, wherein the user terminal is configured to output the information regarding the at least one location via the graphical user interface; and
- based at least in part on the information regarding the at least one location, cause, by the processor of the electronic apparatus, an automated device to move the target item to the at least one location.

12. A terminal, comprising:
an input device configured to receive an input via a graphical user interface of the terminal;
an output device configured to display an output via the graphic user interface; and
a controller configured to:
- receive, by the controller of the terminal, an input of a placement request regarding a target item in a zone via the input device, wherein the zone comprises locations;
- receive, by the controller of the terminal, a range identifier identifying a portion of the zone for placement of the target item, wherein the range identifier is indicative of a subset of the locations within the zone that are eligible for placement of the target item;
- upon the input of the placement request and receiving the range identifier, determine, by the controller of the terminal, the subset of the locations eligible for placement of the target item;

obtain, by the controller of the terminal, location type information for placement of the target item, wherein the location type information is indicative of a characteristic of one or more locations that are suitable for placement of the target item;

receive, by the controller of the terminal, location information for each location of the subset of the locations, the location information indicating one or more particular items stored at a particular location;

based on the target item and the location information for each location of the subset of the locations, identify, by the controller of the terminal, from the subset of the locations, a portion of the subset of the locations, wherein the portion of the subset of the locations are associated with a plurality of location types, wherein each location type of the plurality of location types identifies a characteristic of one or more corresponding locations of the portion of the subset of the locations;

compare, by the controller of the terminal, the location type information for placement of the target item and the plurality of location types;

based on comparing the location type information for placement of the target item and the plurality of location types, determine, by the controller of the terminal, at least one location of the portion of the subset of the locations suitable, wherein a location type of the at least one location matches the location type information for placement of the target item;

output, by the controller of the terminal via the output device of the terminal, information regarding the at least one location through the output device; and based at least in part on the information regarding the at least one location, cause, by the controller of the terminal, an automated device to move the target item to the at least one location.

13. The terminal of claim 12, wherein the controller is further configured to receive, via the input device, an input of identification information for a location of the locations, the location corresponding to a storage unit storing the target item.

14. The terminal of claim 13,
wherein the location does not satisfy a preset condition,
wherein the preset condition is based on one or more of:
a location type of each location of the locations,
stack information of each location of the locations,
attribute information of a plurality of items arranged at each location of the locations, or
a frequency at which information regarding each location of the locations is provided as the information regarding the at least one location.

* * * * *